United States Patent
Fu et al.

(10) Patent No.: US 8,830,634 B2
(45) Date of Patent: Sep. 9, 2014

(54) ASYMMETRIC COMB BORE IN ACTUATOR DESIGN

(75) Inventors: Ta-Chang Fu, San Jose, CA (US);
Zhong-Qing Gong, Fremont, CA (US);
Robert C. Reinhart, San Jose, CA (US)

(73) Assignee: HGST Netherlands B.V., Amsterdam (NL)

(*) Notice: Subject to any disclaimer, the term of this patent is extended or adjusted under 35 U.S.C. 154(b) by 43 days.

(21) Appl. No.: 13/485,350

(22) Filed: May 31, 2012

(65) Prior Publication Data
US 2013/0321950 A1    Dec. 5, 2013

(51) Int. Cl.
*G11B 5/48*     (2006.01)

(52) U.S. Cl.
USPC .................................. 360/265.6; 360/265.7

(58) Field of Classification Search
CPC ................................ G11B 5/48; G11B 5/4813
USPC .......... 360/265.2, 265.3, 265.4, 265.5, 265.6, 360/265.7
See application file for complete search history.

(56) References Cited

U.S. PATENT DOCUMENTS

| | | | |
|---|---|---|---|
| 5,905,608 A | 5/1999 | Frees et al. | |
| 6,018,441 A * | 1/2000 | Wu et al. | 360/265.6 |
| 6,324,034 B1 * | 11/2001 | Misso et al. | 360/265.1 |
| 6,342,992 B1 | 1/2002 | Prater et al. | |
| 6,480,363 B1 | 11/2002 | Prater | |
| 6,525,910 B1 * | 2/2003 | Macpherson et al. | 360/265.6 |
| 6,618,226 B2 | 9/2003 | Prater | |
| 7,085,108 B1 | 8/2006 | Oveyssi et al. | |
| 7,150,094 B2 | 12/2006 | Erpelding | |
| 7,814,643 B2 | 10/2010 | Johnson et al. | |
| 7,859,795 B2 | 12/2010 | Kerner et al. | |
| 8,027,123 B2 | 9/2011 | Kerner et al. | |
| 2004/0125504 A1 * | 7/2004 | Ramsdell | 360/265.2 |
| 2005/0213255 A1 * | 9/2005 | Deguchi et al. | 360/265.2 |
| 2008/0247081 A1 | 10/2008 | Chang et al. | |
| 2008/0266717 A1 * | 10/2008 | Court et al. | 360/265.6 |
| 2008/0267693 A1 * | 10/2008 | Court et al. | 403/14 |
| 2009/0034125 A1 | 2/2009 | Chan et al. | |

OTHER PUBLICATIONS

G. K. Lau and H. Du, Actuated Suspensions with Enhanced Dynamics for HDD, Digests of the IEEE International Magnetics Conference, 2005, Intermag Asia 2005, pp. 1687-1688, Apr. 4-8, 2005.

* cited by examiner

*Primary Examiner* — Craig A. Renner
(74) *Attorney, Agent, or Firm* — Patterson & Sheridan, LLP

(57) ABSTRACT

The present invention generally relates to a head comb for use in a hard disk drive. In one embodiment, the head comb comprises a core body having a bore formed therethrough. The bore is bound by walls having a top extension extending into the opening and a bottom extension extending into the opening. The top extension has a first height, and the bottom extension has a second height that is different than the first height.

19 Claims, 3 Drawing Sheets

US 8,830,634 B2

ASYMMETRIC COMB BORE IN ACTUATOR DESIGN

BACKGROUND OF THE INVENTION

1. Field of the Invention

Embodiments of the present invention generally relate to a head comb for use in a hard disk drive.

2. Description of the Related Art

Actuator dynamics play an important role in a hard disk drive. The hard disk drive has multiple magnetic disks that are vertically stacked within the hard drive. The magnetic disks are read by/written to by magnetic heads that are each coupled to a slider. The sliders are coupled to actuator arms that extend from a head comb. The head comb design affects the actuator dynamics. The head comb pivots within the hard drive on a pivot bearing, which is coupled to both a baseplate and a coverplate for the hard disk drive. A bore through the head comb couples the head comb to the pivot bearing. Typically, the bore through the head comb has a symmetric design in the z-direction and is aligned with the pivot bearing. However, the symmetric bore design results in poor dynamics for the magnetic heads that are adjacent the coverplate due to the vibrations that occur during operation of the hard drive.

The root cause of the poor dynamics for the upper heads is found to be related to the stiffness difference between the coverplate and the baseplate engagement with the pivot bearing. The typical solution is to stiffen the coverplate or make the baseplate weaker. However, there is limited room to stiffen the coverplate, which is achieved by thickening the coverplate. Additionally, weakening the baseplate is not a good option because weakening the baseplate negatively impacts the whole drive level structure by making the structure weaker and thus degrading shock performance.

SUMMARY OF THE INVENTION

The present disclosure generally relates to a head comb for use in a hard disk drive. In one embodiment, the head comb comprises a body having a plurality of actuator arms extending therefrom for actuating one or more sliders over a magnetic disk of the hard drive. The body has a bore formed therethrough that is sized to receive a bearing therethrough. The bore is bound by a wall that has a first contact surface adapted to contact a bearing element and a second contact surface adapted to contact the bearing element. The first contact surface has a first height and the second contact surface has a second height that is different than the first height.

In another embodiment, an actuator arm assembly comprises a head comb. The head comb comprises a body having a plurality of actuator arms extending therefrom for actuating one or more sliders over a magnetic disk of a hard drive. The body has a bore formed therethrough that is sized to receive a bearing therethrough. The bore is bound by a wall that has a first contact surface adapted to contact a bearing element and a second contact surface adapted to contact the bearing element. The first contact surface has a first height and the second contact surface has a second height that is different than the first height. The actuator arm assembly also comprises one or more sliders coupled to the plurality of actuator arms.

In another embodiment, a hard disk drive comprises a chassis, a spindle motor coupled with the chassis, one or more magnetic disks coupled with the spindle motor, an actuator coupled with the chassis, and a head comb coupled with the actuator. The head comb comprises a body having a plurality of actuator arms extending therefrom for actuating one or more sliders over a magnetic disk of the hard drive. The body has a bore formed therethrough that is sized to receive a bearing therethrough. The bore is bound by a wall that has a first contact surface adapted to contact a bearing element and a second contact surface adapted to contact the bearing element. The first contact surface has a first height and the second contact surface has a second height that is different than the first height. The hard disk drive also comprises one or more sliders coupled to the plurality of actuator arms.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present disclosure generally relates to a head comb for use in a hard disk drive. In one embodiment, the head comb comprises a core body having a bore formed therethrough. The bore is bound by walls having a top extension extending into the opening and a bottom extension extending into the opening. The top extension has a first height, and the bottom extension has a second height that is different than the first height.

An Example Disk Drive

Figure 1:
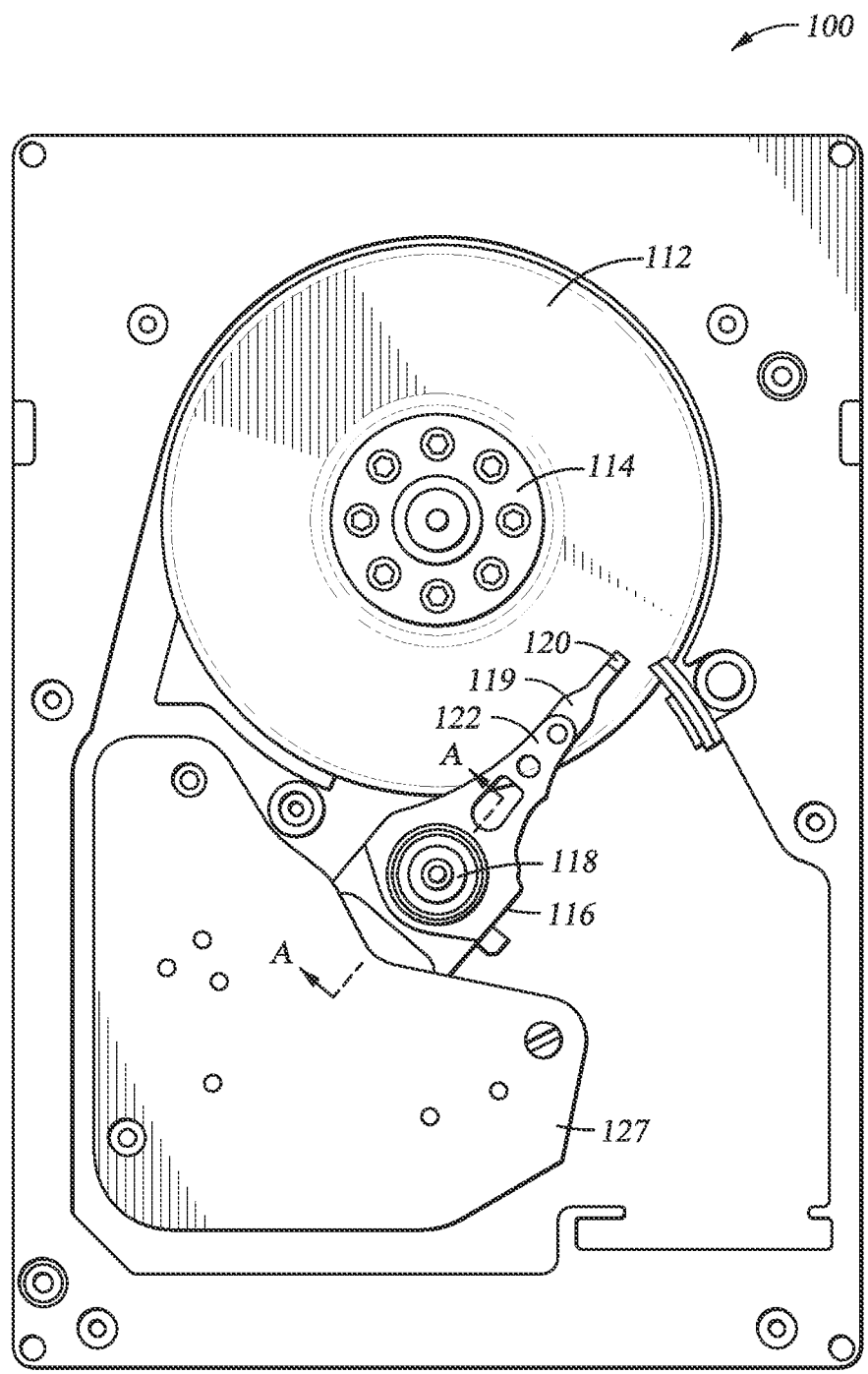
FIG. 1 illustrates a hard disk drive, according to embodiments of the invention.

FIG. 1 illustrates a disk drive 100 embodying this invention. As shown, at least one rotatable magnetic disk 112 is supported on a spindle 114 and rotated by a disk drive motor.

The magnetic recording on each disk is in the form of annular patterns of concentric data tracks (not shown) on the magnetic disk 112.

At least one slider 120 is positioned near the magnetic disk 112, each slider 120 supporting one or more magnetic head assemblies. As the magnetic disk rotates, the slider 120 moves radially in and out over the disk surface so that the magnetic head assembly may access different tracks of the magnetic disk 112 where desired data is written. Each slider 120 is attached to an actuator arm 122 by way of a suspension 119. The suspension 119 provides a slight spring force which biases the slider 120 towards the disk surface. Each actuator arm 122 extends from a head comb 116. The head comb 116 rotates around a bearing 118 and is actuated by an actuator 127. The actuator 127 as shown in FIG. 1 may be a voice coil motor (VCM). The VCM comprises a coil movable within a fixed magnetic field, the direction and speed of the coil movements being controlled by the motor current signals supplied by control unit.

During operation of the disk storage system, the rotation of the magnetic disk 112 generates an air bearing between the slider 120 and the disk surface which exerts an upward force or lift on the slider 120. This air bearing counter-balances the slight spring force of suspension 119 and supports slider 120 off and slightly above the disk surface by a small, substantially constant spacing.

The various components of the disk storage system are controlled in operation by control signals generated by control unit, such as access control signals and internal clock signals. Typically, the control unit comprises logic control circuits, storage means and a microprocessor. The control unit generates control signals to control various system operations such as drive motor control signals and head position and seek control signals. The control signals provide the desired current profiles to optimally move and position slider 120 to the desired data track on disk 112. Write and read signals are also communicated to and from write and read heads.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
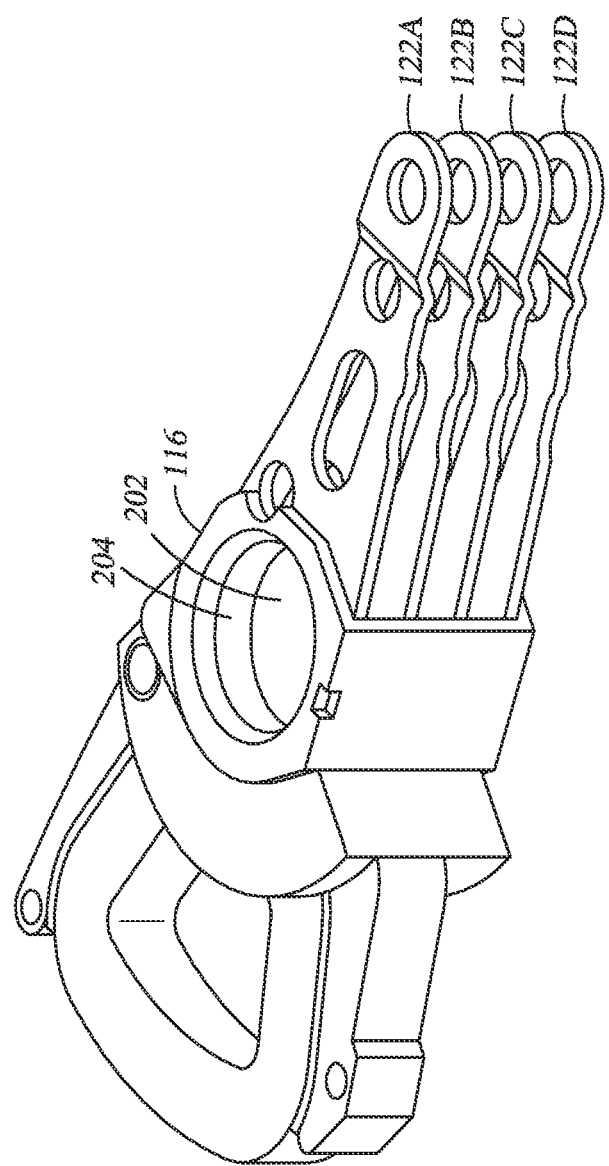
FIG. 2 is a schematic isometric illustration of a head comb according to one embodiment.

FIG. 2 is a schematic isometric illustration of a head comb 116 according to one embodiment. The head comb 116 has a plurality of actuator arms 122A-122D to which sliders 120 will be coupled during operation. The actuator arms 112A-112D extend from the head comb body. The head comb 116 has a bore 202 therethrough for mounting the head comb 116 to the bearing 118. The head comb 116 has one or more contact surfaces 204 that contact the bearing 118.

For the embodiment shown in FIG. 2, four actuator arms 122A-122D are present and thus, the disk drive has three magnetic disks 112. The topmost actuator arm 122A will have a single suspension 119 thereon that has a slider 120 for reading/writing information to the topmost magnetic disk 112. The slider 120 on the topmost actuator arm 122A is for reading/writing data from/to the top surface of the topmost magnetic disk 112. Actuator arm 122B will have two suspensions 119 thereon. One for positioning a slider 120 to the underside of the topmost magnetic disk 112 and another for positioning a slider 120 adjacent the top surface of the middle magnetic disk 112. Actuator arm 122C also will have two suspensions 119 thereon. One for positioning a slider 120 adjacent the bottom surface of the middle magnetic disk 112 and another for positioning a slider 120 adjacent the top surface of the bottom magnetic disk 112. Finally, actuator arm 122D will have a single suspension 119 thereon to position a slider adjacent the underside of the bottom magnetic disk 112.

During operation, data will need to be written to and/or read from the magnetic disk 112. When data needs to be written/read, the magnetic disk 112 will rotate on spindle 114 while the actuator 127 will cause the head comb 116 to move the slider 120 into the appropriate position over the appropriate magnetic disk 112. Once over the appropriate location, the head on the slider 120 will hover over the magnetic disk 112 and read the data from the disk 112 or write data to the disk 112. Naturally, with the magnetic disks 112 rotating and the actuator 127 moving the head comb 116 about the bearing 118, there is significant movement within the hard disk drive 100. One of the resulting vibrations that occurs in hard disk drives is the 'butterfly mode'. The 'butterfly mode' is a resonance vibration in which the sliders 120 (and hence the heads thereon) vibrate in a motion that looks like the flap of a butterfly's wings. Such a vibration causes numerous problems in a hard disk drive. For example, the data may be written to the incorrect location on the magnetic disk 112 due to the vibration of the slider 120 such that when the data is to be retrieved, the data cannot be found. Additionally, during read operations, the head on the slider 120 may be disposed over the incorrect location and thus, not find the data on the magnetic disk 112. Thus, the vibrations in the 'butterfly mode' can cause significant difficulties in data accuracy for hard disk drives.

Figure 3:
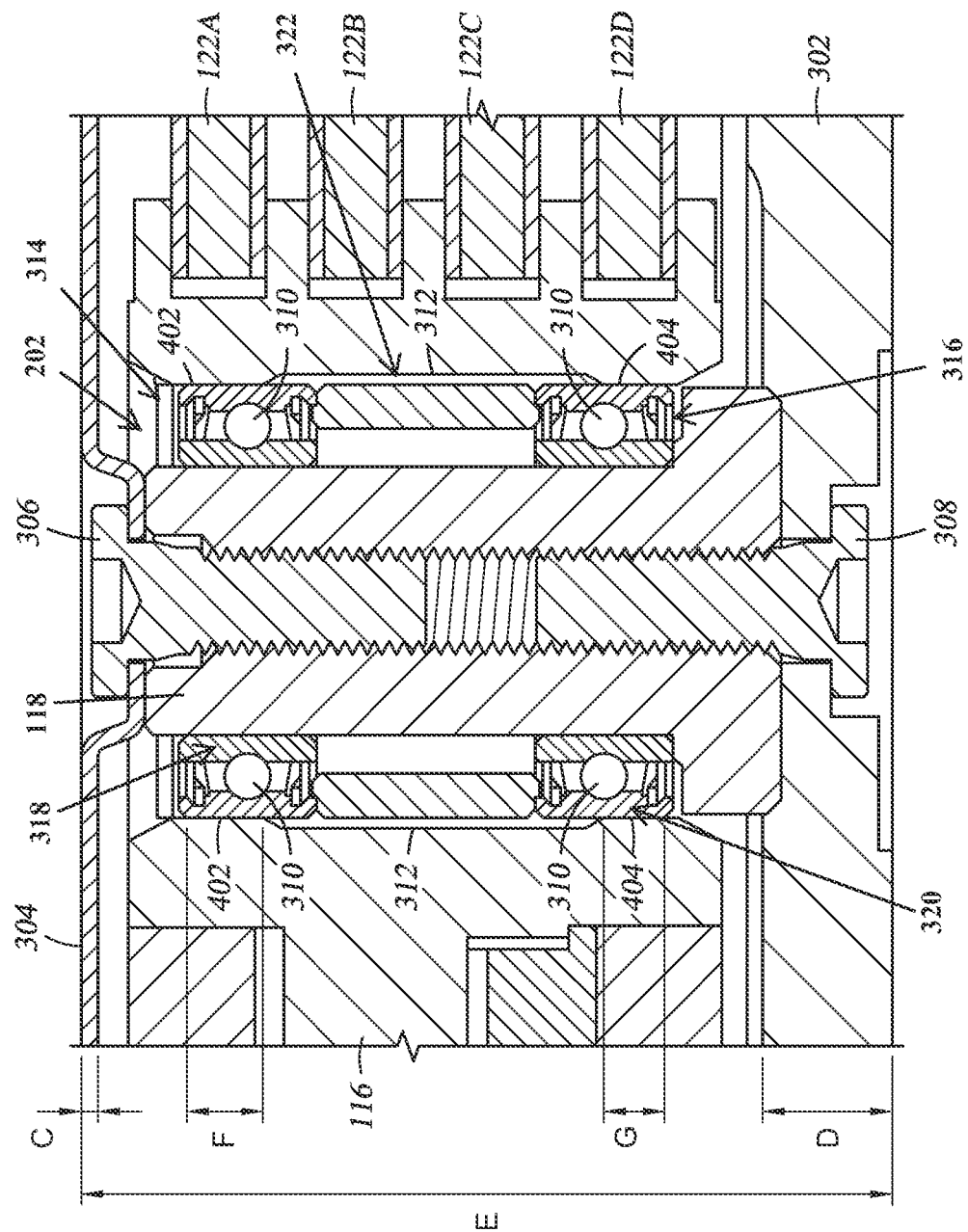
FIG. 3 is a schematic cross sectional illustration of a head comb engaged with a bearing according to one embodiment.

To stabilize the hard disk drive 100 and reduce the 'butterfly mode' vibrations, there are several options. One option to stabilize the hard disk drive and thus reduce the 'butterfly mode' vibrations is to increase the thickness of the coverplate 304. As shown in FIG. 3, the coverplate 304 has a thickness shown by arrows "C". The coverplate 304 may have a thickness of between about 0.4 mm to about 0.7 mm. By increasing the thickness of the coverplate 304, the 'butterfly mode' vibrations can be reduced. However, there is a limited amount of space within the computer for the hard drive, thus hard drive manufacturers have limited room to change the dimensions of the entire hard disk drive and thus there is no room to increase the thickness of the coverplate 304 without making a corresponding decrease in thickness somewhere else in the hard drive so that the total thickness of the hard drive, shown by arrows "E", is not increased. The hard drive 100 may have a thickness between about 26 mm and about 27 mm. Thus, increasing the thickness of the coverplate 304 is not a viable option.

Another option to reduce the 'butterfly mode' vibrations is to decrease the thickness of the baseplate 302. The baseplate 302 has a thickness shown by arrows "D" and is within a range of between about 1 mm to about 3 mm. Decreasing the thickness of the baseplate 302 has the benefit of not increasing the total thickness of the hard drive. However, decreasing the thickness of the baseplate 302 does not provide additional stabilization to the hard drive, but rather, actually destabilizes the hard drive. Decreasing the thickness of the base plate 302 destabilizes the bottom portion of the hard drive and thus permits more vibration of the sliders 120 and heads near the bottom magnetic disks 112. The additional vibration may counteract the effects of the 'butterfly mode', but naturally create additional vibrational issues as well. Thus, increasing the thickness of the coverplate 304 and decreasing the thickness of the baseplate 302, while potential solutions, create additional problems.

Applicants have discovered that by stabilizing the head comb 116, vibrations in the 'butterfly mode' can be reduced without increasing the thickness of the coverplate 304 or decreasing the thickness of the baseplate 302. As shown in FIG. 3, the bearing 118 is disposed within the bore 202. The bearing 118 is fixed to the baseplate 302 and the coverplate 304 and thus the head comb 116 pivots/rotates around the bearing 118. The bearing 118 is fixedly coupled to the coverplate 304 by a coupling mechanism 306, such as a threaded bolt, extends through the coverplate 304 of the disk drive 100 and engages a threaded center of the bearing 118. Similarly, a coupling mechanism 308, such as a threaded bolt, extends through the baseplate 302 of the disk drive 100 and engages the threaded center of the bearing 118. The bearing 118 is thus fixedly attached to the disk drive 100.

The bearing 118 has a first bearing element 314 that is adjacent the coverplate 304 and a second bearing element 316 is adjacent the baseplate 302. Both the first and second bearing elements 314, 316 circumscribe the bearing 118. The bearing elements 314, 316 each have a ball bearings 310 coupled between two sleeves 318, 320. Sleeve 318 is fixedly coupled to the bearing 118 while sleeve 320 is fixedly coupled to the head comb 116. During operation, sleeve 318 remains stationary while sleeve 320 moves with the head comb 116 and thus, the ball bearing 310 therebetween moves along sleeve 318.

The head comb 116 has a wall 312 that is spaced from the bearing 118 by a gap 322. The wall 312 has a first contact surface 402 adjacent the coverplate 304 and a second contact surface 404 adjacent the baseplate 302. The first contact surface 402 and the second contact surface 404 are coupled to sleeves 320. As shown in FIG. 3, both the first contact surface 402 and the second contact surface 404 extend inwards from the wall 312 towards the bearing 118. In operation, the bearing 118 remains stationary and the head comb 116 rotates due to actuation by the actuator 127. The first contact surface 402 and second contact surface 404, together with the sleeves 320 coupled thereto move along the ball bearing elements 310 while the ball bearing elements 310 move along sleeves 318. The first contact surface 402 has a height shown by arrow "F" while the second contact surface 404 has a height shown by arrow "G".

As discussed above, one cause of the poor dynamics for the upper head is found to be related to the stiffness difference between the coverplate 304 and the baseplate 302 engagement with the pivot bearing 118. Stiffening the coverplate 304 to increase "C" is not possible due to the dimensional limitations for the disk drive 100. Decreasing the thickness of the baseplate 302 by decreasing "D" is not advisable because weakening the baseplate 302 negatively impacts the whole drive level structure by making the structure weaker and thus degrading shock performance.

Applicants have discovered that by changing the height of the first contact surface 402 relative to the second contact surface 404 for the head comb 116, stability of the disk drive 100 significantly increases while the dimensions for the coverplate 304 thickness, baseplate 302 thickness and disk drive 100 thickness is not altered. Thus, Applicants have discovered that having a head comb 116 with contact surfaces 402, 404 that are asymmetric, the stability of the disk drive 100 is improved.

FIG. 3 is a schematic cross sectional illustration of a head comb 116 (taken along section line A of FIG. 1) engaged with a bearing 118 according to one embodiment. As shown in FIG. 3, the first contact surface 402 has a height shown by arrows "F" while the second contact surface 404 has a height shown by arrows "G". The first contact surface 402 has a greater height than the second contact surface 404. In one embodiment, the ratio of the height of the first contact surface 402 to the height of the second contact surface 404 is between about 2:1 to about 1.1:1. In one embodiment, the first contact surface 402 may have a height shown by arrows "F" of between about 1.1 mm and about 1.4 mm. In one embodiment, the second contact surface 404 may have a height shown by arrows "G" of between about 0.7 mm and about 1.0 mm. Thus, the contact point for the sleeves 320 is smaller adjacent the baseplate 302 of the head comb 116 as compared to the contact point for the sleeves 320 adjacent the coverplate 304.

Because the head comb bore is asymmetric, the contact surfaces with the sleeves 320 are different adjacent the coverplate 304 and baseplate 302 of the head comb 116. The larger contact area for the first contact surface 402 and the smaller contact area for the second contact surface 404 significantly improves the actuator dynamics at the butterfly mode region because the first contact surface 402 provides a greater stability compared to the second contact surface 404. Applicants have discovered that by increasing the height of the first contact surface 402 relative to the second contact surface 404, the vibrations in the 'butterfly mode' that naturally occur are reduced. The vibrations in the 'butterfly mode' are reduced due to the increased stiffness adjacent the coverplate 304. Thus, while the thickness of the coverplate 304 cannot be increased due to the space requirements for the hard drive 100 in the computer, the benefits of increasing the coverplate 304 thickness can be realized. Namely, the increase in height for the first contact surface 402 relative to the second contact surface 404 stabilizes the head comb 116, in the same manner that simply increasing the coverplate 304 would do, but the total thickness of the head comb 116 and the hard disk drive 100 does not change. Therefore, hard disk drive manufacturers may achieve desired stability (i.e., reducing the 'butterfly mode' vibrations) within the same footprint and without the need to change the coverplate 304 or baseplate 302 design. The asymmetric comb bore has more design room than simply stiffening the coverplate 304 because both contact surfaces of the head comb bore can be adjusted. Additionally, the device level structure and dynamics are not degraded because the thickness of the baseplate 302 has not changed.

The second contact surface 404 is smaller than the first contact surface 402 to compensate for the stiffness difference of the coverplate 304 and baseplate 302. A symmetric bore has a significant phase change and instability and thus results in vibrations in the 'butterfly mode' (i.e., fundamental vibration for the head). The asymmetric bore, such as shown in FIG. 3, has a smooth phase change and more than 100 degrees of improvement in the 'butterfly mode'. Thus, the asymmetric comb bore design has a stable phase change at the 'butterfly mode' and improves significantly the actuator dynamics so that there is more design room for servos.

By adjusting the contact surfaces of the head comb that engage the bearing element, more stable disk drives can be produced without increasing the total size of the hard disk drive by increasing the coverplate thickness. Additionally, more stable disk drives can be produced without weakening the disk drive by decreasing the thickness of the baseplate.

While the foregoing is directed to embodiments of the present invention, other and further embodiments of the invention may be devised without departing from the basic scope thereof, and the scope thereof is determined by the claims that follow.

What is claimed is:

1. A head comb for use in a hard disk drive, comprising:
 a body having a plurality of actuator arms extending therefrom for actuating one or more sliders over a magnetic disk of the hard drive, the body having a bore formed therethrough that is sized to receive a bearing therethrough, the bore bound by a wall, the wall having a first contact surface extending inwards from the wall towards the bearing and a second contact surface extending inwards from the wall towards the bearing, wherein a gap is formed between the first contact surface and the second contact surface and the first contact surface having a first height and the second contact surface having a second height that is different than the first height, and wherein the gap is located at a position corresponding to an axial center of the bore.

2. The head comb of claim 1, wherein a ratio of the first height to the second height is between about 1.1:1 and 2:1.

3. The head comb of claim 2, wherein the first height is between about 1.1 mm and about 1.4 mm.

4. The head comb of claim 1, wherein the first height is greater than the second height.

5. The head comb of claim 4, wherein the first height is between about 1.1 mm and about 1.4 mm.

6. The head comb of claim 4, wherein the second height is between about 0.7 mm and about 1.0 mm.

7. The head comb of claim 1, wherein the first height is between about 1.1 mm and about 1.4 mm and wherein the second height is between about 0.7 mm and about 1.0 mm.

8. An actuator arm assembly, comprising:
a head comb, the head comb comprising a body having a plurality of actuator arms extending therefrom for actuating one or more sliders over a magnetic disk of a hard drive, the body having a bore formed therethrough that is sized to receive a bearing therethrough, the bore bound by a wall, the wall having a first contact surface extending inwards from the wall towards the bearing and a second contact surface extending inwards from the wall towards the bearing, wherein a gap is formed between the first contact surface and the second contact surface and the first contact surface having a first height and the second contact surface having a second height that is different than the first height, and wherein the gap is located at a position corresponding to an axial center of the bore; and
one or more sliders coupled to the plurality of actuator arms.

9. The actuator arm assembly of claim 8, wherein a ratio of the first height to the second height is between about 1.1:1 and 2:1.

10. The actuator arm assembly of claim 9, wherein the first height is between about 1.1 mm and about 1.4 mm.

11. The actuator arm assembly of claim 8, wherein the first height is greater than the second height.

12. The actuator arm assembly of claim 11, wherein the first height is between about 1.1 mm and about 1.4 mm.

13. The actuator arm assembly of claim 11, wherein the second height is between about 0.7 mm and about 1.0 mm.

14. A hard disk drive, comprising:
a chassis;
a spindle motor coupled with the chassis;
one or more magnetic disks coupled with the spindle motor;
an actuator coupled with the chassis;
a head comb coupled with the actuator, the head comb comprising a body having a plurality of actuator arms extending therefrom for actuating one or more sliders over a magnetic disk of the hard drive, the body having a bore formed therethrough that is sized to receive a bearing therethrough, the bore bound by a wall, the wall having a first contact surface adapted to contact the bearing and a second contact surface adapted to contact the bearing, wherein the first contact surface and the second contact surface are the same diameter, the first contact surface having a first height and the second contact surface having a second height that is different than the first height, the bearing having a first bearing element contacting the first contact surface and a second bearing element contacting the second contact surface, and the first bearing element is adjacent to a cover plate and the second bearing element is adjacent to a base plate; and
one or more sliders coupled to the plurality of actuator arms.

15. The hard disk drive of claim 14, wherein a ratio of the first height to the second height is between about 1.1:1 and 2:1.

16. The hard disk drive of claim 15, wherein the first height is between about 1.1 mm and about 1.4 mm.

17. The hard disk drive of claim 14, wherein the first height is greater than the second height.

18. The hard disk drive of claim 17, wherein the first height is between about 1.1 mm and about 1.4 mm.

19. The hard disk drive of claim 17, wherein the second height is between about 0.7 mm and about 1.0 mm.

* * * * *